(12) United States Patent
Walsh

(10) Patent No.: US 10,473,503 B2
(45) Date of Patent: Nov. 12, 2019

(54) FLOW METER

(71) Applicant: Hartridge Limited, Warwick (GB)

(72) Inventor: Aaron Walsh, Upton (GB)

(73) Assignee: HARTRIDGE LIMITED (GB)

( * ) Notice: Subject to any disclaimer, the term of this patent is extended or adjusted under 35 U.S.C. 154(b) by 211 days.

(21) Appl. No.: 15/565,274

(22) PCT Filed: Apr. 7, 2016

(86) PCT No.: PCT/EP2016/057674
§ 371 (c)(1),
(2) Date: Oct. 9, 2017

(87) PCT Pub. No.: WO2016/162448
PCT Pub. Date: Oct. 13, 2016

(65) Prior Publication Data
US 2018/0306623 A1    Oct. 25, 2018

(30) Foreign Application Priority Data
Apr. 10, 2015  (GB) .................................. 1506070.0

(51) Int. Cl.
*G01F 3/16* (2006.01)
*F02M 65/00* (2006.01)
*G01F 25/00* (2006.01)

(52) U.S. Cl.
CPC ............. *G01F 3/16* (2013.01); *F02M 65/001* (2013.01); *G01F 25/0007* (2013.01)

(58) Field of Classification Search
CPC ...... G01F 3/16; G01F 25/0007; F02M 65/001
See application file for complete search history.

(56) References Cited

U.S. PATENT DOCUMENTS

| | | | |
|---|---|---|---|
| 4,569,220 A | 2/1986 | Hopfe et al. | |
| 4,714,998 A | 12/1987 | Bussey et al. | |
| 5,388,965 A | 2/1995 | Fehn | |
| 5,553,490 A | 9/1996 | Nicholls et al. | |
| 6,763,731 B1 | 7/2004 | Padden | |
| 7,254,993 B2 * | 8/2007 | Metzler | A62C 99/00 73/114.47 |
| 9,746,364 B2 * | 8/2017 | Derschmidt | G01F 3/10 |
| 2006/0201244 A1 | 9/2006 | Metzler et al. | |
| 2011/0029259 A1 * | 2/2011 | Cunningham | G01F 25/0007 702/47 |

FOREIGN PATENT DOCUMENTS

| | | |
|---|---|---|
| JP | 2008-286765 A | 11/2008 |
| KR | 10-1021167 B1 | 3/2011 |

* cited by examiner

*Primary Examiner* — Freddie Kirkland, III
(74) *Attorney, Agent, or Firm* — Joshua M. Haines

(57) ABSTRACT

A positive linear displacement flow rate meter includes a first chamber for receiving a substance such as diesel from a fuel injector and applying a substance force to one end of a piston, wherein an opposing force is applied, such as by air pressure, in a second chamber, to the other piston end, and a comparator, for indicating to a control unit to discard invalid piston displacement measurements, until the substance force is substantially equal to the opposing force, allowing accurate flow rate measurement independent of variation in conditions between uses of the meter.

8 Claims, 3 Drawing Sheets

FLOW METER

CROSS REFERENCE TO RELATED APPLICATIONS

This application is a national stage application under 35 USC 371 of PCT Application No. PCT/EP2016/057674 having an international filing date of Apr. 7, 2016, which is designated in the United States and which claimed the benefit of GB Patent Application No. 1506070.0 filed on Apr. 10, 2015, the entire disclosures of each are hereby incorporated by reference in their entirety.

TECHNICAL FIELD

The present invention relates to flow rate measurement, and in particular to a stabilization detection for a linear positive displacement flow meter, suitable for use in measuring a flow rate of a fuel injection system such as a diesel injection system.

BACKGROUND OF THE INVENTION

Linear positive displacement flow meters typically utilize a piston inside a cylinder. The substance to be measured is directed into the cylinder and the flow of the substance causes the piston to be displaced along the cylinder. The piston displacement is measured, and since the piston area is known, the displacement can be converted mathematically to a flow rate. The flow of the substance being measured can be linear, or in the case of diesel injection systems, pulsating.

An "opposing force", i.e. a force opposing the substance, is normally applied to the piston. The application of the opposing force has three main effects:
  preventing the piston from overshooting at the end of the cylinder;
  preventing oscillation of the piston, when a pulsating flow is being measured;
  maintaining the substance being measured under compression, thereby preventing errors in reading due to air coming out of solution when the substance in a fluid;
  returning the piston back towards its datum when full travel has been reached, or when the measured substance needs to be drained from the cylinder.

For the substance to move the piston, the "substance force", i.e. the force applied to the piston by the substance, must overcome the opposing force being applied to the piston. From actuation of the meter, the substance force increases, until it reaches a threshold point, at which it is equal to the opposing force. The point at which the threshold point is reached is indicated by 'X' on FIG. 1, which is a graphical illustration of substance force (Newtons), against number of injections of fuel from a diesel fuel injector. As the force applied by the substance increases above the threshold point, the piston will begin to move, against the opposing force.

Any flow rate measurements taken before the threshold point is reached will be incorrect and need to be discarded.

An increase in the volume or a reduction in the force on the measurement cylinder side of the piston will require measurements to be discarded until the substance force once again overcomes the opposing piston force. This typically occurs after the substance is emptied from the cylinder. A change in volume may also be caused by upstream hydraulic valves that divert the flow from multiple injectors into the metering unit. It may be worth mentioning this.

As illustrated in FIG. 1, substance force increases up until the sixteenth injection, at which point it reaches the threshold value. Therefore first 16 measurements taken by the meter are invalid and should be discarded.

Known linear positive displacement flow meters typically discard measurements following a reduction in substance force using a combination of the following:
  a time duration;
  a piston displacement;
  a number of flow pulses.

The algorithm used to discard invalid measurements is normally derived through experiment, over a range of flow conditions. However, the algorithm itself is susceptible to errors in test conditions, due to variations in system dynamics caused by, for example:
  errors in the opposing force on piston;
  viscosity and density of the substance;
  temperature of the substance and meter;
  humidity;
  altitude;
  friction;
  wear of components.

SUMMARY OF THE INVENTION

It is an object of the present invention to provide a linear positive displacement flow meters which at least mitigates the problems encountered with known embodiments.

Accordingly the present invention provides, in a first aspect, a signalling means for signalling to a control unit of a flow rate meter is provided; the flow rate meter comprising a piston located within a main bore, a first chamber towards a first end of the piston for receiving a substance, and a second chamber at a second end of the piston remote from the first end. The signalling means comprising: a comparator means and a first pressure sensor provided in the first chamber. In use of the meter, a substance pressure, comprising pressure of the substance within the first chamber, applies a substance force to a first end of the piston. Wherein, an opposing force is applied to the second end of the piston. Wherein, a difference between the substance force and the opposing force causes linear displacement of the piston, from an initial position, within and along an axial axis of the main bore. Wherein measurements received by the control unit comprise measurements of linear displacement of the piston from an initial position received from a displacement measuring means, and measurements of time taken for a predetermined displacement of the piston from the initial position received from a timing means. Wherein, in use of the meter, the comparator means receives measurements of substance pressure from the first pressure sensor, and calculates substance force using a predetermined area of the first end of the piston. Wherein the comparator means compares the substance force to the opposing force, wherein the opposing force is either a predetermined constant force, or is calculated by the comparator means from measurements of opposing pressure received from a second pressure sensor, and a predetermined area of the second end of the piston. Wherein based on the comparison of the substance force and the opposing force, the comparator means provides a signal to the control means as to whether the control means should record or disregard measurements received from measuring means and the timing means.

The opposing force may comprise air pressure.

The comparator means may convert substance pressure measurements, received from a first pressure sensor, and air pressure measurements, received from a second pressure sensor, to substance force readings and opposing force readings respectively.

In an alternative embodiment, the opposing force is provided by a spring located within the second chamber.

In a further aspect, the present invention comprises a flow metering apparatus, comprising a meter as above, a control unit for receiving measurements from the measurement device a signal from the comparator means, and a substance source which supplies the substance to the first chamber via a substance inlet.

The substance source may comprise a diesel fuel injector.

The present invention also comprises, a method of measuring a flow rate of a substance using an apparatus in accordance with the present invention, the method comprising steps of;
- supplying substance from the substance source to the first chamber;
- the measurement means relaying measurements of the linear displacement of the piston along the bore to the control unit;
- the comparator means comparing the substance force and the opposing force; and
- if the substance force is less than the opposing force, the comparator relaying a signal to the control unit to disregard measurements received from the measurement means;
- if the substance force is equal to, or is within a predetermined tolerance below, or is greater than, the opposing force, the comparator relaying a signal to the control unit to record measurements received from the measurement means.

BRIEF DESCRIPTION OF THE DRAWINGS

The present invention is now described by way of example with reference to the accompanying Figures in which.

and

Figure 3:
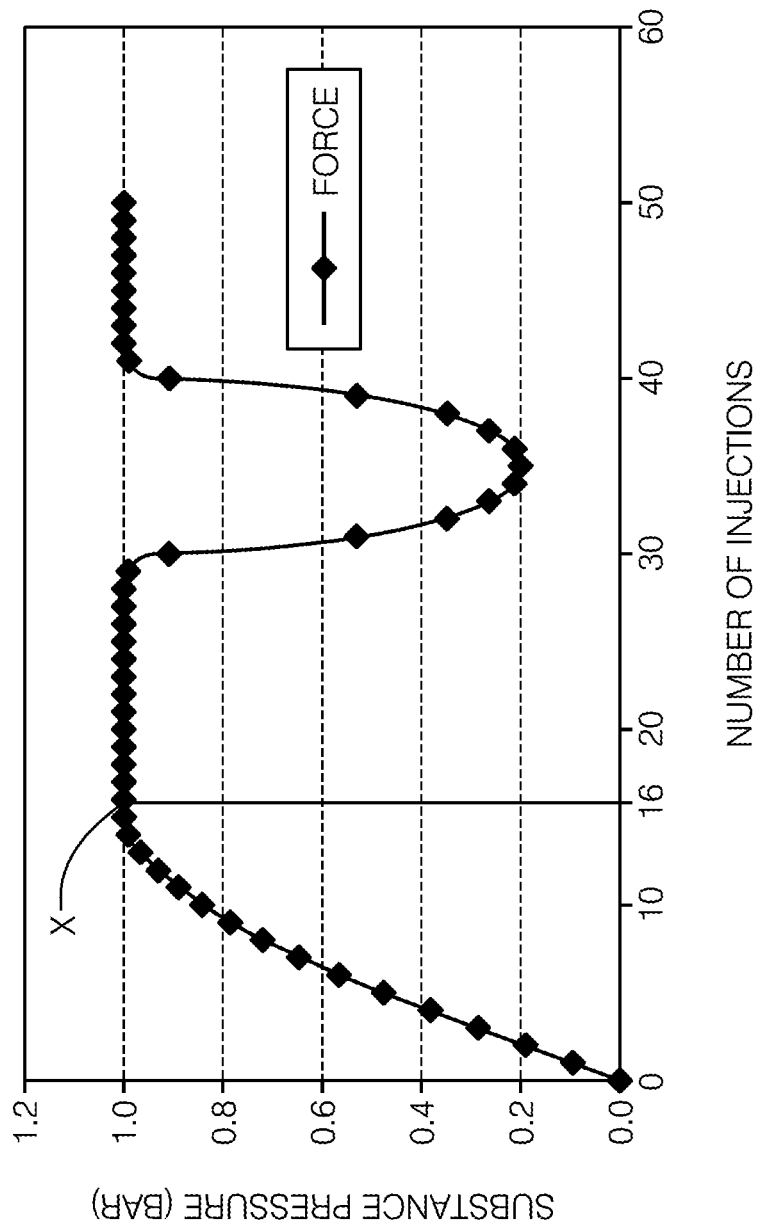

FIG. 3 is a graphical representation of substance pressure against number of injections of fuel from a diesel fuel injector.

DESCRIPTION OF THE PREFERRED EMBODIMENTS

Figure 1:
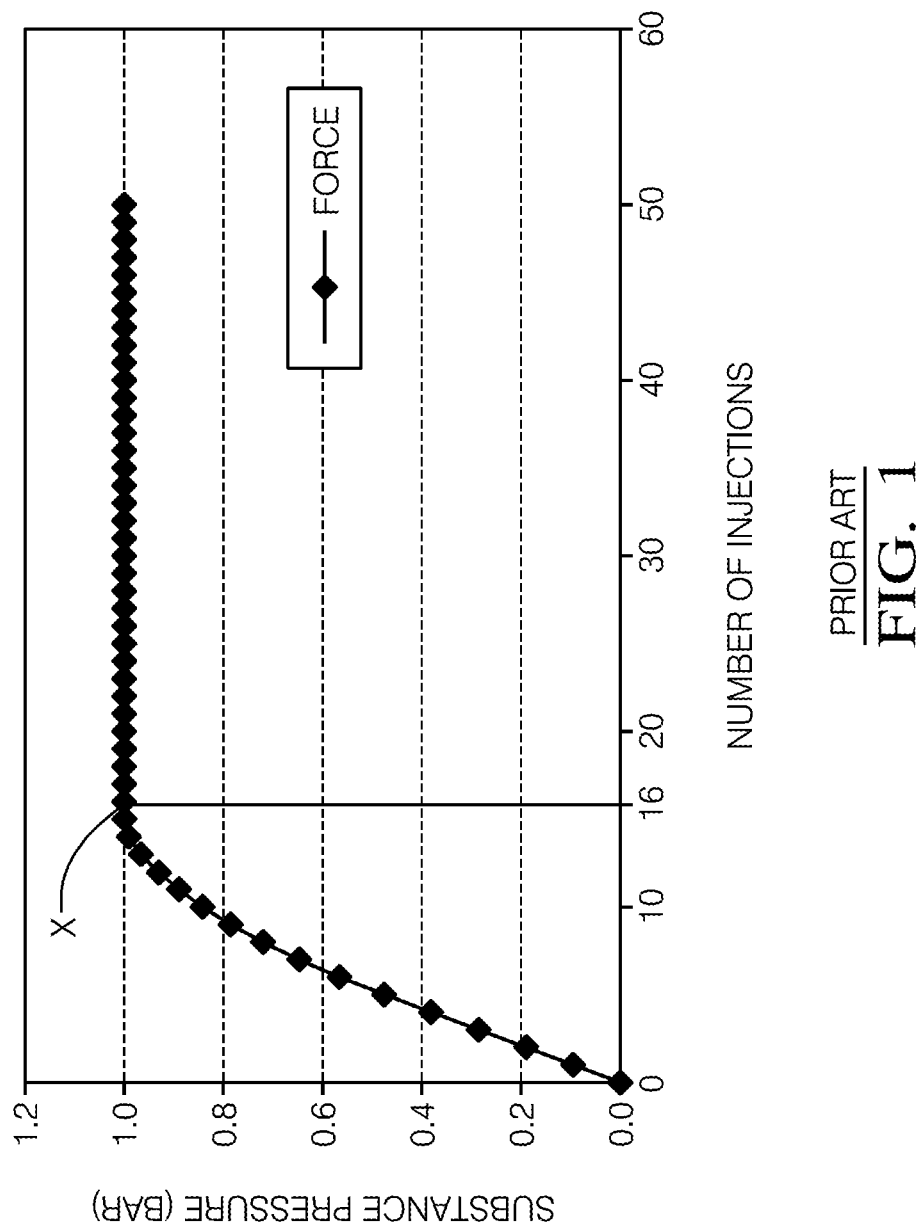
FIG. 1 is a graphical illustration of substance pressure against number of injections of fuel from a diesel fuel injector.
Figure 2:
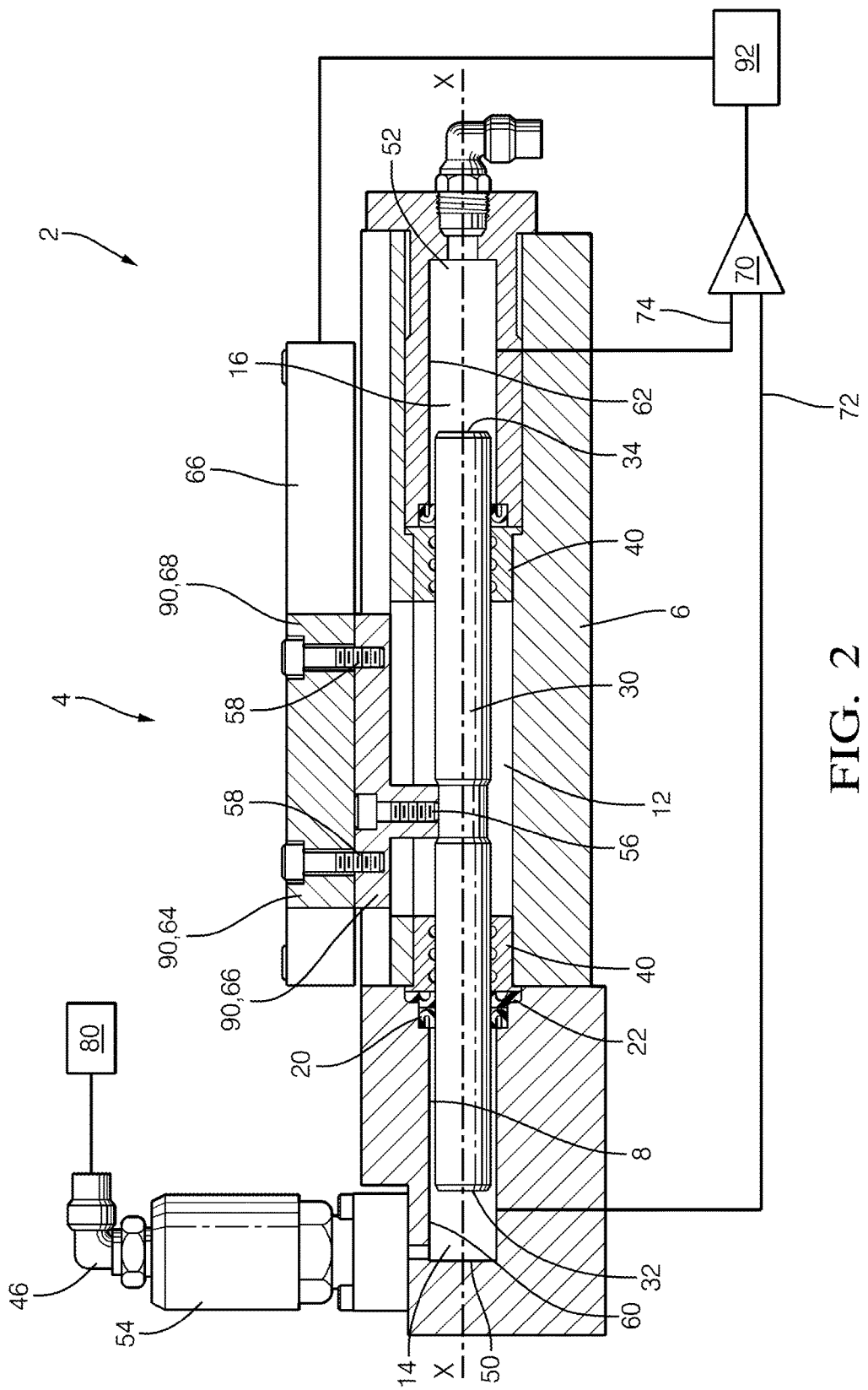
FIG. 2 is a partial cross-sectional and partial schematic view of a linear positive displacement flow meter apparatus in accordance with the present invention.

As illustrated in FIG. 2, the present invention comprises signalling means for use in a linear positive displacement flow meter 4. The scope of the present invention also comprises a flow metering apparatus 2 including the linear positive displacement flow meter 4.

The meter 2 comprises a main body 6, with a void, comprising a main bore 8 provided within the main body 6. The main bore 8 comprises a first bore section 60 towards a first end 50 of the main bore 8, a second bore section 62 towards a second end 52 of the main bore 8 (remote from the first end 60), and a mid-section 12 between the first and second bore sections 60, 62.

A first chamber 14 is defined within the first bore section 60, and a second chamber 16 is defined within the second bore section 62.

A piston 30 is supported within the main bore 8 by piston guides, provided by bearings 40 located at either end of the mid-section 12. The piston 30 is arranged for linear movement along the main bore 8, i.e. axially along the piston guide, in the X axis as indicated on FIG. 2.

The piston has a first end comprising a first end face 32, within the first bore section 60, and a second end comprising a second end face 34, remote from the first end face 32 and within the second bore section 62.

The meter 2 further comprises a displacement and time measuring means, comprising a displacement measurement device 90. The displacement measurement device 90 comprises a guide block 64, a linear sensor and encoder 66, and an arm 68. The arm 68 is attached to the piston 30 by a first fixing screw 56, and the linear sensor and encoder 66 is attached the arm 68 by second fixing screws 58. Any linear displacement of the piston 30, i.e. movement from an initial position, axially within the main bore 8 will therefore cause corresponding linear movement of the arm 68, and the guide block 64. Any such linear movement is detected by the linear sensor and encoder 66, and a signal representative of the linear displacement is relayed to a control unit 92 (shown schematically in FIG. 2).

The meter 2 further comprises a timing means comprising a timing device, to measure the time taken for a predetermined linear movement of the piston 30 to occur, i.e. the time taken for the piston 30 to move a predetermined distance from the initial position. Measurements representative of the time taken for a predetermined displacement of the piston 30 along the bore 8 are relayed to the control unit 92.

Once the meter 2 is actuated, a substance, of which the flow rate is to be measured, is fed into the first chamber 14 via a substance inlet 46 and fill/drain valve 54. The substance inlet 46 is supplied by a substance source 80 (shown schematically in FIG. 2).

The first chamber 14 is sealed by a first chamber main seal 20 and a first chamber backup seal 22, to prevent any substance from leaking into the mid-section 12 of the main bore 8.

As the substance force within the first chamber 14 increases, the substance exerts an increasing force on the first end face 32 of the piston 30. A first pressure sensor (not shown) is provided to measure the substance pressure, and forward the substance pressure measurements to a comparator means, comprising a comparator 70, via a link 72 (shown schematically in FIG. 2).

An opposing force is applied to the second end face of the piston 30. In the present embodiment, the opposing force results from air pressure. Air is supplied to the second chamber 16 via an air inlet 48; air pressure within the second chamber 16 thereby exerts the opposing force on the second end face 34 of the piston 30. Once a predetermined, i.e. regulated air pressure, is reached within the second chamber 16, this predetermined level of air pressure is maintained, whilst the meter 2 is powered.

The second chamber 16 is sealed by a second chamber seal 24, to prevent air from leaking into the mid-section 12 of the main bore 8.

A second pressure sensor (not shown) is provided to measure the air pressure within the second chamber 16, and forward the measurements to the comparator 70, via a link 74 (shown schematically in FIG. 2).

On operation of the meter 2, but when the substance force is less than the opposing force (for example if any substance in the first chamber 14 has previously been drained), any measurements of linear displacement of the piston 30 from the initial position, taken by the displacement measurement device 90, and time measurements taken by the timing device, are not representative of the flow rate of the substance into the first chamber 14.

On continued operation of the meter 2, as further substance is fed into the first chamber 14 via the substance inlet 46, the pressure of the substance within the first chamber 14 increases.

The comparator 70 converts the measurements of substance pressure in the first chamber 14, and of air pressure in the second chamber 16, to a substance force and an opposing force respectively, based on the known areas of the end faces 32, 34 of the piston 30. The comparator 70 then compares the substance force and the opposing force, and relays a command to the control unit 92 based on the comparison. Specifically, if the substance force is less than the opposing force, the comparator 70 signals to the control unit to disregard piston displacement measurements being received from the displacement measurement device 90 and time measurements being received from the timing device.

The substance pressure within the first chamber 14 increases, causing a corresponding increase in substance force, until a threshold point is reached. The threshold point is reached when the substance force is equal to, or within a given tolerance below, the opposing force. At the threshold point and above, i.e. when the substance force is equal to, or within a given tolerance below the opposing force, and when the substance force increases above the opposing force, the comparator 70 signals to the control unit 92 to record displacement measurements provided by the displacement measurement device 90 and time measurements provided by the timing device.

After the threshold point, a net force, resulting in an increased substance force acting on the first end face 32 compared to the opposing force acting on the second end face 34, causes the piston 30 to move axially along the main bore 8, away from the first end 50 of the main bore 8, and towards the second end 52 of the main bore 8. As the arm 66 is attached to the piston 30, the arm is also caused to move, in the same direction as the piston 30.

After the threshold point, i.e. after the substance force on the piston 30 applied by the substance pressure in the first chamber 14 has overcome the opposing force applied by the air pressure in the second chamber 16, linear movement of the piston 30 is representative of the flow rate of the substance being supplied to the first chamber 14. After receiving the signal from the comparator 70 that the threshold point has been reached, the control unit 92 begins to record the linear piston displacement measurements received from the displacement measurement device 90 and time measurements received from the timing device. These measurements are subsequently converted mathematically to flow rate readings, using the known area of the first end face 32 of the piston 30.

Flow rate is calculated by the equation:

$$\text{Flow rate(mm}^3/S) = \frac{\text{piston displacement(mm)}}{\text{time (S)}} \times \text{substance piston area (mm}^2)$$

where:
piston displacement is linear displacement of the piston 30, axially within the main bore 8, as measured by the displacement measurement device 90;

substance piston area is the area of the first end face 32 of the piston 30; and
time is the time taken for the piston displacement to occur, as measured by the timing device.

During use of the meter 2, the substance force may subsequently decrease to a point below the threshold, i.e. the substance force may reduce to less than the opposing force during use. A drop in substance force during use of the meter 2 could be caused by, for example, a change in volume between the substance source 80 and the meter 2 due to flow valves changing state. Flow valves could be used for example, with a substance source 80 comprising multiple fuel injectors, to direct a flow the fuel injectors into the first chamber 14 of the meter 2.

The comparator 70 continually measures the substance force, therefore if such a reduction occurs, the comparator 70 will signal to the control unit 92 to once again disregard displacement received from the measurement device 90 and time measurements from the timing device. Subsequently, when the comparator 70 indicates that the substance force is once again equal to or within a predetermined tolerance below, or is greater than the opposing force, i.e. when the substance force once again reaches and exceeds the threshold point, it will signal the control 92 to once again record displacement measurements from the displacement measurement device 90 and time measurements from the timing device.

FIG. 3 is a graphical representation of the substance pressure (Bar), against number of injections of fuel from a diesel fuel injector. The threshold point is first reached at point X. (A graph corresponding to FIG. 3 but showing substance force (Newtons) against number of injections would show an identical trace).

In the example of FIG. 3, it can be seen that after actuation of the meter 2, the threshold point is first reached after 16 injections of the fuel injector. After 30 injections, the substance pressure drops below the threshold line. After 40 injections, the once again reaches the threshold point. Therefore in this example, the comparator 70 would indicate to the control unit 92 to record displacement measurements between 16 and 30 injections, and once again after 40 measurements. Measurements before 16 injections, and between 30 and 40 injections, would be discarded.

In the present invention, a substance could be fed into the first chamber 14 in a continuous manner, or in a pulsating manner, for example if the substance is fuel, and the substance source 80 is a fuel injector.

If a substance is being fed into the first chamber 14 in a continuous manner, a graph similar to FIG. 3 would indicate substance pressure or force against time from actuation, rather than number of injections. The control unit 92 would disregard displacement measurements received from the measurement device 90 and time measurements received from the timing device during an initial time period, during which the comparator 70 indicates that the threshold point has not yet been reached, and also during any subsequent time period during which the comparator 70 indicates that the substance force has dropped below the threshold point.

After use of the meter 2 and as necessary, any substance can be drained from the first chamber 14, out of the substance inlet 46, via the fill/drain valve 54.

In the above embodiment, the comparator 70 converts substance pressure and air pressure to a substance force and an opposing force, and compares the force values. However, if the first end face 32 and second end face 34 of the piston 30 are of equal area, the comparator 70 may compare the substance and air pressures directly, without converting to forces. The output signal to the control unit 92 would therefore be based on whether the substance pressure was equal to (or within a predetermined tolerance below), or is greater than, the air pressure.

The present invention measures the force applied by an injected substance, such as diesel from an injector, on one end face 32 of the piston 30, and an opposing force on the opposing end face 34 of the piston, wherein the opposing force is provided by air pressure. However, in alternative embodiments, the opposing force could be provided by another means. For example, the supply of air from the inlet 48 could be replaced by a spring located within the second chamber 16, which is arranged to provide a constant opposing force to the second end of the piston 30, specifically to the second end face 34 of the piston 30. In this alternative embodiment, the comparator 70 compares a substance force, calculated from a substance pressure received from a pressure sensor and the known area of the end face 32, with an opposing force from received from a force sensor provided between the spring and the second end face 34 of the piston 30. Alternatively, the opposing force could be a known spring force constant.

In the present invention, the control unit 92 receives compared measurements of substance and air pressure from the comparator 70, linear piston displacement measurements from the displacement measurement device 90, and time measurements from the timing device. Stabilization detection is enabled by the comparator 70 signalling to the control unit 92 to discard measurements received from the measurement device 90 and the timing device before the comparator 70 indicates that the substance and opposing forces are substantially equal (i.e. the substance force is equal to, or within a predetermined tolerance below, the opposing force). When the substance force is substantially equal to, or is greater than the opposing force, displacement and time measurements are recorded by the control unit 92.

The present invention discards invalid readings of piston displacement and time for each use of the meter, based on measurements of opposing force which are specific to that use. Therefore any variation in conditions between uses of the meter, (such as substance viscosity and density, temperature of substance and components, humidity, altitude, friction or component wear), do not affect the accuracy of the stabilization detection and subsequent piston displacement readings.

REFERENCES apparatus 2
meter 4
main body 6
main bore 8
bore mid-section 12
first chamber 14
second chamber 16
first chamber main seal 20
first chamber backup seal 22
second chamber seal 24
piston 30
piston first end face 32
piston second end face 34
bearings 40
substance inlet 46
bore first end 50
bore second end 52
fill/drain valve 54
first fixing screw 56
second fixing screws 58
bore first section 60
bore second section 62
guide block 64
linear sensor and encoder 66
arm 68
comparator 70
link 72
link 74
substance source 80
displacement measurement device 90
control unit 92
X axis
T threshold line

The invention claimed is:

1. A signalling means for signalling to a control unit of a flow rate meter; the flow rate meter comprising a piston located within a main bore, a first chamber towards a first end of the piston for receiving a substance, and a second chamber at a second end of the piston remote from the first end, the signalling means comprising:
a comparator means; and
a first pressure sensor provided in the first chamber;
wherein in use of the flow rate meter, a substance pressure, comprising pressure of the substance within the first chamber, applies a substance force to a first end of the piston;
and wherein an opposing force is applied to the second end of the piston;
and wherein a difference between the substance force and the opposing force causes linear displacement of the piston, from an initial position, within and along an axial axis of the main bore;
wherein measurements received by the control unit comprise measurements of linear displacement of the piston from an initial position received from a displacement measuring means, and measurements of time taken for a predetermined displacement of the piston from the initial position received from a timing means;
wherein, in use of the flow rate meter, the comparator means receives measurements of substance pressure from the first pressure sensor, and calculates substance force using a predetermined area of the first end of the piston;
and wherein the comparator means compares the substance force to the opposing force, wherein the opposing force is either a predetermined constant force, or is calculated by the comparator means from measurements of opposing pressure received from a second pressure sensor, and a predetermined area of the second end of the piston;
and wherein based on the comparison of the substance force and the opposing force, the comparator means provides a signal to the control means as to whether the control means should record or disregard measurements received from measuring means and the timing means.

2. A signalling means as claimed in claim 1 wherein the opposing force comprises air pressure.

3. A signalling means as claimed in claim 2 wherein the comparator means converts substance pressure measurements, received from the first pressure sensor, and air pressure measurements, received from the second pressure sensor, to substance force readings and opposing force readings respectively.

4. A signalling means as claimed in claim 1 wherein the opposing force is provided by a spring located within the second chamber.

5. A flow metering apparatus comprising:
a piston located within a main bore;
a first chamber towards a first end of the piston for receiving a substance;
a second chamber at a second end of the piston remote from the first end;
a substance source which supplies the substance to the first chamber via a substance inlet; and
a signalling means for signalling to a control unit, the signaling means comprising:
a comparator means; and
a first pressure sensor provided in the first chamber;
wherein in use of the flow metering apparatus, a substance pressure, comprising pressure of the substance within the first chamber, applies a substance force to the first end of the piston;
and wherein an opposing force is applied to the second end of the piston remote from the first end;
and wherein a difference between the substance force and the opposing force causes linear displacement of the piston, from an initial position, within and along an axial axis of the main bore;
wherein measurements received by the control unit comprise measurements of linear displacement of the piston from an initial position received from a displacement measuring means, and measurements of time taken for a predetermined displacement of the piston from the initial position received from a timing means;
wherein, in use of the flow metering apparatus, the comparator means receives measurements of substance pressure from the first pressure sensor, and calculates substance force using a predetermined area of the first end of the piston;
and wherein the comparator means compares the substance force to the opposing force, wherein the opposing force is either a predetermined constant force, or is calculated by the comparator means from measurements of opposing pressure received from a second pressure sensor, and a predetermined area of the second end of the piston;
and wherein based on the comparison of the substance force and the opposing force, the comparator means provides a provides a signal to the control means as to whether the control means should record or disregard measurements received from measuring means and the timing means.

6. A flow metering apparatus as claimed in claim 5 wherein the substance source comprises a diesel fuel injector.

7. A method of measuring a flow rate of a substance using a flow metering apparatus as claimed in claim 5, comprising steps of;
supplying the substance from the substance source to the first chamber;
the displacement measurement means relaying measurements, representative of the linear displacement of the piston along the main bore, to the control unit;
the timing means relaying measurements, representative of the time taken for a predetermined linear displacement of the piston along the main bore, to the control unit;
the comparator means receiving substance pressure readings from the first pressure sensor, and calculating a substance force reading from a substance pressure reading a known area of the first end of the piston;
comparing the substance force and the opposing force, wherein the opposing force is either a known constant, or is calculated from opposing pressure readings provided by the second pressure sensor and a known area of the second of the piston; and
if the substance force is less than the opposing force, the comparator means relaying a signal to the control unit to disregard measurements received from the displacement measurement means and from the timing means;
if the substance force is equal to, or is within a predetermined tolerance below, or is greater than, the opposing force, the comparator means relaying a signal to the control unit to record measurements received from the measurement means and the from timing means;
the control unit calculating a flow rate of the substance being supplied to the first chamber.

8. A method as claimed in claim 7 wherein to calculate a flow rate of the substance being supplied to the first chamber, the control unit uses an equation:

$$\text{Flow rate}(mm^3/S) = \frac{\text{piston displacement}(mm)}{\text{time }(S)} \times \text{substance piston area }(mm^2)$$

where:
piston displacement is linear displacement of the piston, axially within the main bore, as measured by the displacement measurement device;
substance piston area is the area of the first end face of the piston; and
time is the time taken for the piston displacement to occur, as measured by the timing device.

* * * * *